United States Patent Office 3,708,465
Patented Jan. 2, 1973

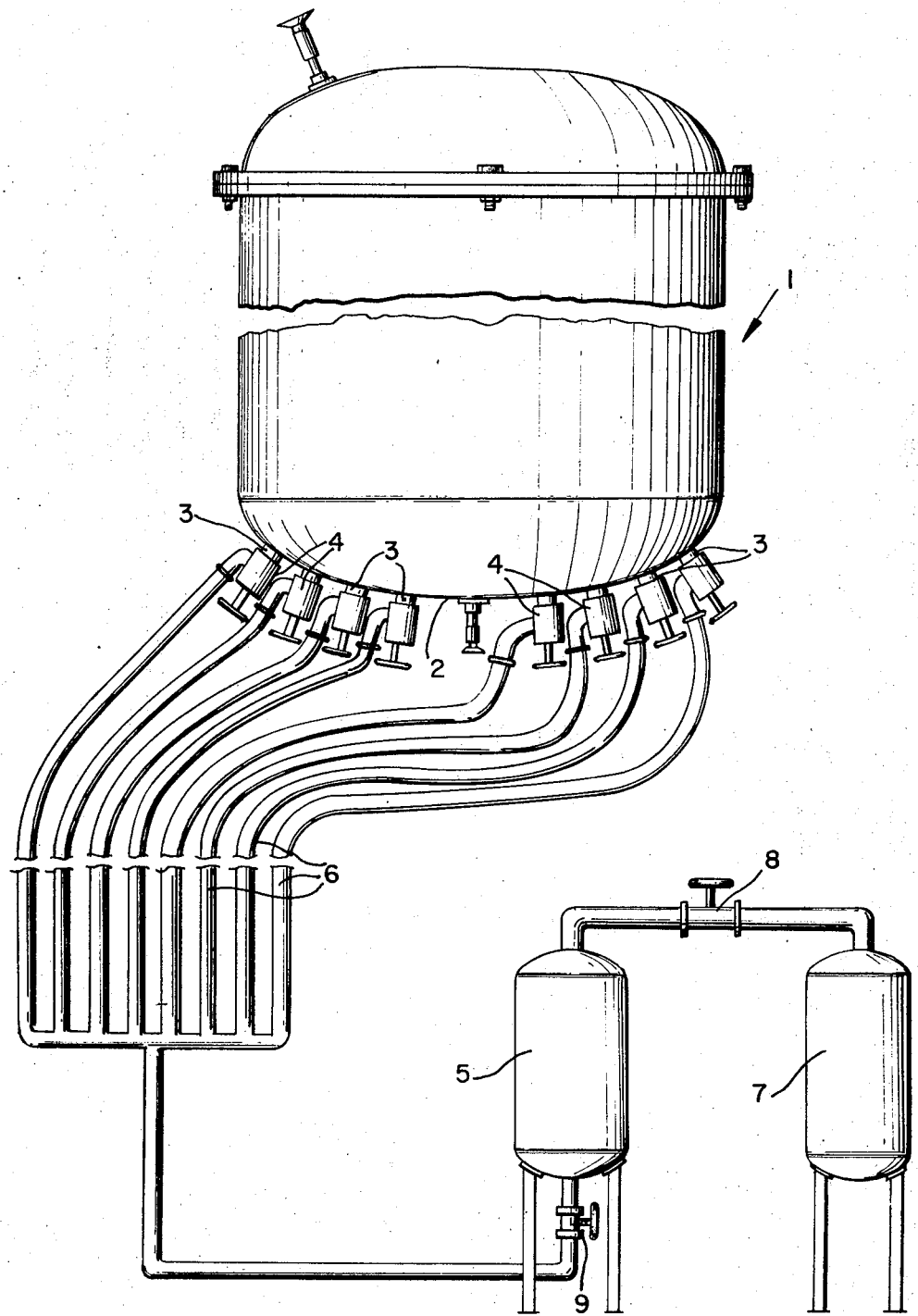

3,708,465
METHOD AND APPARATUS FOR INTERRUPTING THE POLYMERIZATION OF OLEFINS
Johannes Dietrich, Oswald Wolff, Hermann Amrehn, and Gunter Beckmann, Marl, Germany, assignors to Chemische Werke Huls Aktiengesellschaft, Marl, Germany
Filed Jan. 12, 1971, Ser. No. 105,871
Claims priority, application Germany, Jan. 13, 1970, P 20 01 183.0
Int. Cl. C08f 1/82, 3/00
U.S. Cl. 260—93.7     10 Claims

ABSTRACT OF THE DISCLOSURE

An apparatus and method for interrupting the polymerization of ethylene, propylene, or 1-butene having a polymerization catalyst comprising a mixture of an aluminum-organic compound with a salt, freshly precipitated oxide or hydroxide of metals of Groups IV–B, V–B or VI–B of the Periodic System, including thorium and uranium which comprises adding to a suspension of the olefin and catalyst about 15 to 100 mole percent of a deactivator comprising an organic compound which contains oxygen, an organic compound which contains oxygen and hydrogen, an organic compound which contains hydrogen, hydrogen halide or water, relative to the alkyl group and/or hydride group bonded to the aluminum of the aluminum-organic compound.

CROSS-REFERENCES TO RELATED APPLICATIONS

Applicants claim priority under 35 U.S.C. 119 for application P 20 01 183.0, filed Jan. 13, 1970, in the Patent Office of the Federal Republic of Germany.

The disclosure of assignee's copending application Ser. No. 13,721, filed Feb. 24, 1970, is incorporated herein. Application Ser. No. 13,721 discloses the state of the art of polymerization reactors for olefins and particularly poly-1-butene.

BACKGROUND OF THE INVENTION

The field of the invention is tanks for chemical treatment and polymerization of synthetic resins from acyclic compounds.

The subject of the invention is a process for interrupting the reaction of olefin polymerization which are being carried out in the presence of Ziegler mixed catalysts of a heavy metal compound and an aluminum-organic compound.

It is known that olefins such as ethylene, propylene or 1-butene can be polymerized in the low pressure range with Ziegler catalysts. The Ziegler catalysts normally comprise two components, namely an aluminum-organic compound, for example ethyl-aluminum sesquichloride, diethyl-aluminum monochloride, triethyl-aluminum or triisobutyl-aluminum or aluminum-alkyl hydrides such as diethyl-aluminum hydride or diisobutyl-aluminum hydride, and a heavy metal halide or alkoxide or alkoxy halide, such as for example, titanium tetrachloride, titanium trichloride or vanadyl trichloride or dialkoxytitanium dihalide or vanadyl trialkoxide. For the polymerization, the catalysts are mixed in an organic solvent such as pentane, hexane, heptane, benzene or toluene or in liquefied gases under pressure, while stirring, and the monomer is then introduced in the gaseous or liquid form. In special cases, polymerization can also be carried out in the liquid or gaseous monomer without solvent, provided steps are taken that material transfer and heat transfer takes place to an extent appropriate to the reaction, that is to say, if the concentrations and temperatures in the reaction space can be controlled.

The state of the art of olefin polymerization with Ziegler catalysts may be ascertained by reference to the Kirk-Othmer "Encyclopedia of Chemical Technology," 2nd edition, vol. 14 (1967), pp. 217–313 under the section "Olefin Polymers," particularly pp. 269–274 (Ziegler Polyethylene Manufacture), 292–299 (Polypropylene Manufacture), and 309–313 (Poly-1-butene).

The state of the art of Zeigler catalysts used in olefin polymerization may be ascertained by reference to U.S. patent applications Ser. Nos. 482,412, filed Jan. 17, 1955, and 482,413, filed Jan. 17, 1955, both now abandoned, and U.S. Pat. 3,257,332, all of Karl Ziegler. The Ziegler patent discloses a polymerization catalyst comprising the product formed by mixing an aluminum trialkyl such as aluminum triethyl, aluminum tripropyl or aluminum tridodecyl with salts, freshly precipitated oxides or hydroxides of metals of Groups IV–B, V–B and VI–B of the Periodic System, including thorium and uranium. A preferred concentration of the aluminum trialkyl relative to the salts, oxides or hydroxides of the metals is 2 N to 3 N moles of aluminum trialkyl per mole of metal compound where $n$ is the valence of the metal group member.

The polymerization reaction is exothermic and the heat evolution is about 900 Kcal./kg. for ethylene (gaseous monomer), about 500 Kcal./kg. for propylene (liquid monomer), and about 300 Kcal./kg. for 1-butene (liquid monomer). The reaction temperatures depend greatly on the particular formulation, and are for example, between 70 and 85° C. for ethylene, between 70 and 80° C. for propylene and between 10 and 100° C. for 1-butene. The pressures depend on the nature of the monomer and on the degree of saturation of the solvent containing the catalyst, with the monomer. Normally, polymerization is carried out at pressures which are above atmospheric pressure, in order to be sure to avoid atmospheric oxygen being drawn in through leaks in the reaction system. With ethylene, particularly high reaction speeds are achieved at higher pressure (15 to 50 atmospheres gauge), since a higher saturation of the solvent with ethylene is thereby achieved. Propylene and 1-butene can advantageously be polymerized in the range of the boiling pressure of the monomer or solvent-monomer mixture. The reaction times lie in the range of a few minutes to 50 hours. They depend on the one hand on the nature of the monomer, the activity of the catalyst system, the monomer concentration, the temperature and the inhibiting effect of molecular weight regulators which may be present, or of the solvent itself, while on the other hand they must be suited to the heat removal capacity of the reaction system. As regards the nature of the monomer, it is found that the reaction time becomes longer, when fewer double bonds are available, per carbon atom in the monomer, for bonding by polymerization.

All olefin polymerizations can in principle be carried out discontinuously, that is to say, in individual batches, or continuously in stirred reactors or cascades of stirred reactors. Of particular interest industrially and economically is continuous polymerization. The reaction system is uninterrupted, has uniform supply of all components of the formulation, has stationary conditions in the reaction space, and the contents, containing polymer, are continuously withdrawn.

A high quality standard of the polymer formed can only be maintained with extremely strict control of the amounts of the components of the formulation which are introduced into the reaction system. The reaction temperature, the stirring conditions and the dwell time are equally important and must be uniform. Fluctuations, especially of the amounts of catalyst or the quantity ratio of the catalyst components, or fluctuations in the amount of the component which regulates the molecular weight, have an effect on the average molecular weight and the molecular weight distribution of the polymer and hence to a great extent also on the mechanical properties of the polymer.

In operating large scale industrial polymerization installations, it can happen that as a result of technical faults in the reaction system or in the equipment which precedes or follows the reaction system, the polymerization reaction must be temporarily interrupted. For example, an interruption is necessary if the outlet pipeline of the reaction system is blocked, or if the centrifuges usually employed to isolate the polymer powder have to be taken out of operation. If the current fails, or if the steam usually required for working up and drying the powder fails, the polymerization must, of course, also be intrreupted. There exists a large number of further causes, which depend greatly on the process technology, for an interruption of the polymerization reaction. It can be assumed that the frequency of interruptions of the reaction lines, depending on the nature of the process, between several times daily and once a month for olefin polymerization with Ziegler catalysts.

Interruption of the reaction is not a problem only in small reaction systems, wherein small amounts of as yet unreacted monomers are present in the reaction space, the heat removal capacity is sufficiently greater for conducting away the heat of polymerization even when the stirrer fails, and discarding the entire particular contents of the reaction space is an insignificant loss.

In large scale industrial reactors, on the other hand, difficulties of the following nature arise if the reaction is interrupted:

After the inputs and the outputs of the reaction or of the reactors have been turned off so as to interrupt the reaction, the contents of the reactor continue to react, during which time the monomer still present in the reaction system is converted. In general, it can be assumed that the catalysts present in the reaction system still possess a sufficient activity to effect this conversion of the residual monomer. Assuming that the reactor cooling and the reactor stirring still function fully at this time, the solids content and hence the viscosity of the contents of the reactor increase until the reaction subsides due to lack of monomer. Even this favorable case of slow subsiding of the reaction will, in most cases, have disadvantageous consequences, since the later reaction does not of its own accord furnish polymer of the correct type. The reason for the deviation from the quality standard of the polymer is that the stationary reaction conditions, which previously prevailed, change constantly during the later reaction.

Additional disadvantages and hazards however arise if the cooling and/or the stirring of a reactor fails and an immediate interruption of the reaction is particularly and urgently necessary for this reason. If the reaction is then not interrupted within a few minutes, the pressure and temperature in the reactor rise very rapidly above the intended values, and under certain circumstances up to the design limit of the reactor. If the safety valve has been blocked with polymer, the reactor can explode. Even if the safety valve responds and hydrocarbon gases are blown off at roof level, a dangerous situation results because the heavy hydrocarbon gases sink down onto the factory roadways and can ignite there.

The state of the art of processes for interrupting olefin polymerizations may be ascertained by reference to U.S. Pat. 3,066,130 of Grundmann et al. which issued Nov. 27, 1962. Grundmann et al. disclose a process for removing solid catalyst residues from a suspension of a solid polyolefin polymer in an aliphatic hydrocarbon dispersant wherein the polymer has been prepared by the low pressure polymerization of an olefin in a catalyst system consisting of (1) a metallo-organic compound of an element of Groups I–III of the Periodic Table, and (2) a compound of a metal of subgroups IV–IV of the Periodic Table, which comprises adding to the suspension about 0.5–5.0 percent by volume, based on the dispersant of a monohydric alcohol, heating the mixture to a temperature of about 40° C. to 100° C. to dissolve catalyst residues, and then extracting the whole of the mixture with water, whereby the catalyst residues are transferred in solution to the aqueous phase. Complete decomposition of the catalyst is thereby achieved, provided it is still possible adequately to mix the alcohol with the reactor contents. (If the stirrer fails, the reactor contents continue to rotate for some time.)

This process, however, has the disadvantage that the reactor contents which have stopped with the alcohol must be completely emptied out and that the empty reactor must be cleaned and dried before the reaction can be allowed to restart, because the alcohol is only consumed to a small extent in its reaction with the catalyst. The greater part is left. Even very small amounts of alcohol, which can for example remain on the reactor wall, which is in most cases contaminated, would prevent the start of the new reaction. The labor expended on emptying, cleaning and drying large reactors is considerable, and the interruption in production is between one day and several days.

There is thus an urgent requirement for a process which effect a reliable interruption of the reaction of olefin polymerizations and which permits immediate stoppage of the polymerization reaction without overhead pressure release, and subsequent restarting of the reaction, with the product quality remaining the same, without emptying and cleaning the reactor, it being necessary for the field of use of the process also to extend to the case of failure of the reactor cooling and, if a certain technical embodiment is used, even to the case of failure of the reactor stirring.

SUMMARY OF THE INVENTION

Having in mind the limitations of the prior art, it is an object of the present invention to provide a method for interrupting the polymerization of olefins which facilitates the resumption of the polymerization process.

The method according to the present invention is based on the discovery that the alkyl groups and hydride groups, bonded to aluminum, in polymer batches containing mixed Ziegler catalysts, react selectively and quantitatively under suitable conditions with alcohols or other substances. These deactivator compounds react with the alkyl and/or hydride groups before the heavy metal component of the mixed catalyst, for example, the titanium compound, is attacked.

Accordingly, the general object of the invention is to supply deactivators to the reactor contents, for the purpose of interrupting the reaction, in an amount which is so chosen that it suffices to block the activity of the organometallic component without chemically converting the heavy metal halide.

The process is carried out industrially by adding to the reaction mixture, as a deactivator, an organic compound which contains oxygen and/or active hydrogen, or a halogen halide or water, up to the stoichiometric amount relative to the alkyl groups or hydride groups, bonded to aluminum, which are present in the reaction mixture.

BRIEF DESCRIPTION OF THE DRAWING

The invention itself, however, is understood more readily from the following more detailed description when considered in connection with the accompanying drawing, wherein:

The figure is a vertical sectional view of the chemical treatment apparatus which shows one embodiment of the invention.

In the figure, the reactor 1 has at its lower end dome 2, and eight connections 3 which are closed by piston valves 4. The piston valves when closed have their ends flush with the inner wall of the kettle. Pipelines 6 are run to the eight connections from a supply vessel 5 which contains the accurately chosen amount of deactivator. In the dilution which is described in the subsequent disclosure, the pipelines are so constructed that each presents approximately the same pipeline resistance when material flows through it. The gas space of the supply vessel is connected to one or more compressed nitrogen cylinders 7. When the reaction is to be interrupted, the piston valves are simultaneously and automatically opened. As a result of excess pressure of the nitrogen in the supply vessel, the deactivator flows instantaneously into the reactor through the eight connections. The excess nitrogen which follows causes stirring by gas bubbles and within a short time a uniform distribution of the deactivator in the kettle results. Check valve 8 is located between nitrogen cylinders 7 and the supply vessel 5, while check valve 9 is located between supply vessel 5 and piston valves 4.

DESCRIPTION OF THE PREFERRED EMBODIMENTS

Specific examples of deactivators added to the mixed aluminum-heavy metal Ziegler catalyst in amounts up to the stoichoimetric amount (15 to 100 mole percent) relative to the alkyl groups and/or hydride groups bonded to the aluminum-organic compound include as organic compounds which contain oxygen and/or active hydrogen:

aliphatic, cycloaliphatic and aromatic alcohols having 1 to 8 carbons atoms;
phenols having 6 to 16 carbon atoms;
ethers having 2 to 10 carbon atoms;
ketones having 3 to 10 carbon atoms;
aldehydes having 1 to 10 carbon atoms; and
carboxylic acids having 1 to 12 carbon atoms.

Suitable organic compounds are aliphatic, cycloaliphatic and aromatic alcohols, having 1 to 8 carbon atoms, preferably with boiling points below 200° C. and phenols having 6 to 16 carbon atoms, for example methanol, ethanol, n-propanol, isopropanol, the primary, secondary and tertiary butanols, pentanols, hexanols, heptanols and octanols, cyclohexanol and the isomeric alkylcyclohexanols, benzyl alcohol, phenol as well as o-, m- or p-cresol.

Preferably, aliphatic alcohols, especially lower aliphatic alcohols are used, and of these methanol, ethanol, n-propanol or isopropanol and the butanols are particularly advantageous. In general, it will be of advantage to use the alcohol which is also employed in the further processing of the polymer, but it can also be advantageous to use, for stopping the polymerization, an alcohol which dissolves particularly easily in hydrocarbons, but can be easily separated therefrom by distillation, such as for example, one of the isomeric octanols.

Ethers having 2 to 10 carbon atoms are suitable, such as dimethyl ether, diethyl ether, dipropyl ether, dibutyl ether, tetrahydrofurane, tetrahydropyrane and mixed ethers, and also acetals or diacetals.

Ketones having 3 to 10 carbon atoms are suitable, such as acetone, methyl ethyl ketone, diethy ketone, methyl propyl ketone, the isomeric pentanones, hexanones, heptanones and octanones, as well as cyclic ketones, such as cyclohexanone and the like.

The alcohols, ethers and ketones are appropriately employed in an amount of 30 to 100 mole percent, relative to the alkyl groups or hydride groups, bonded to alumiunm, of the catalyst which are present in the reaction mixture.

Further suitable organic compounds are aldehydes having 1 to 10 carbon atoms, such as formaldehyde, acetaldehyde, propionaldehyde and their homologues, cycloaliphatic aldehydes, aromatic aldehydes such as benzaldehyde and their homologues, or carboxylic acids such as formic acid, acetic acid, propionic acid or butyric acid.

These substances are employed in an amount of 15 to 50 mole percent, relative to the alkyl groups or hydride groups, bonded to aluminum, which are present in the catalyst of the reaction mixture.

It is also possible to use the hydrogen halides, above all hydrogen chloride and also hydrogen bromide, as well as water. These substances are employed in an amount of 30 to 100 mole percent, relative to the alkyl groups or hydride groups, bonded to aluminum, which are present in the catalyst of the reaction mixture.

Of course, it is also possible to employ a mixture of several of the deactivators mentioned, it being necessary to ensure that their total molar percentage amount, relative to the alkyl groups or hydride groups, bonded to aluminum, which are present in the reaction mixture, lies within the propionate maximum amount and minimum amount.

For example, it is possible to employ an alcohol containing water; in this case it is, however, advisable that the amount of water should not be chosen too high, so that the water is still dissolved in the polymerization batch, which after all consists substantially of hydrocarbons which are not good solvents for water. A major amount of water is hence, for example, admissible if the process is, for example, carried out in the presence of benzene, which dissolves a relativey large amount of water and can serve as a diluent for the deactivator.

Thus, according to the invention, twice the amount of deactivator has to be employed if, for example, it is desired to deactivate the same molar amount of diethyl-aluminum monochloride instead of monoethyl-aluminum dichloride. Of course, it is desirable to keep the quantity of deactivator employed for interruption of the reaction as low as possible, on the one hand because the amount of alkyl needed for revival of the reaction at the end of the process discontinuation has to be extracted additionally in the washing step, while on the oher hand, because deactivators with higher molecular weights in general lead to catalyst decomposition residues which are more difficult to extract. For that reason it is recommended to limitate the amount of deactivator to .45% by volume of the dispersing or solving medium. (In bulk polymerization the non converted fraction of the monomer is to be regarded as dispersing or solving medium.)

In order that better and more rapid distribution of the deactivating substances in the reaction space should be achieved, and that hence a selective reaction, directed only towards the aluminum-organic component, should take place, it is advisable to add the deactivator in the form of a gas or in a highly diluted form. In most cases, 0.5 to 10 percent by weight solutions in an inert solvent, for example, in propane, butane, pentane, hexane, cyclohexane, heptane and the like, benzene, toluene or their homologues, are suitable. The liquid monomers such as propene or butene can also be employed as solvents for the deactivator. In the case where introduction takes place in the gas phase, it is again possible to ensure good dilution by other gases such as hydrogen, nitrogen, carbon dioxide, the noble gases helium and argon and the like, or by the gaseous monomer.

It is advantageous to distribute the deactivator rapidly and uniformly by stirring the reaction mixture with gas bubbles.

Since all alkyl-aluminum compound is practically not consumed in the course of a polymerization, it is easy to calculate precisely the requisite amount of deactivator from the amount of the former substance employed and from the capacity of the reactor in which it is desired to interrupt the polymerization, and to make this amount of deactivator available. It is also possible to determine the quantity of aluminum which is still active analytically, for example, by titration with isoquinoline.

The molar quantities of deactivator, used for the reversible reaction interruption as claimed by us, may be for the example of the butene-1-polymerization. In the butene-1-polymerization according to Ziegler the catalysts diethyl-aluminum chloride and titanium trichloride are used in the molar ratio of 1:.5 to 1:1. In order to interrupt the reaction, for each 10 moles of diethyl-aluminum chloride (corresponding to 20 moles of alkyl groups) one uses 6 to 20 moles of methanol irrespective of the quantity of titanium trichloride. The effect of the interruption within this range is a characteristic feature of the methanol qauntity:

from 6 to 15 mole strong decrease of reaction rate (creep reaction); allowed discontinuation of the process for a short duration from 15 to 17 mole instant stoppage of the reaction; suitable for process discontinuation of arbitrary duration from 17 to 20 mole instant stoppage of the reaction; however, if deactivator is not mixed rapidly into reactor contents, there is a risk of damaging a part of the heavy metal halide catalyst resulting from local overconcentration of the deactivator.

In most cases the use of 15 to 17 moles of methanol per 20 moles of alkyl groups will be favourable. It will be noted that for a complete stoppage of the reaction, not necessarily all alkyl groups have to react with methanol, but only a certain proportion, namely about 75% of the alkyl groups.

Employing other deactivators and/or catalyst systems, as mentioned above, of course, one should proceed along analogous lines.

A suitable method for easy checking of a successful reaction interruption, without the disadvantages of U.S. Pat. 3,066,130, is testing the content of as yet active heavy metal halide in the interrupted batch. Its chemical composition must not have changed, which can for example, be rapidly demonstrated by assessing the color.

The reaction is restarted in a simple manner, by adding the organometallic compound. The reaction then continues to run at normal speed, as soon as the quantity which has been subsequently run corresponds to that which has previously been blocked.

Without further elaboration, it is believed that one skilled in the art can, using the preceding description, utilize the present invention to its fullest extent.

EXAMPLE 1

1-butene is continuously polymerized to poly-1-butene in a cascade of several 8 cubic meter stirred autoclaves. The following are introduced hourly into the first autoclave of the series:

(a) 300 kg./hour 1-butene monomer,
(b) 600 kg./hour hexane,
(c) 0.6 kg./hour diethyl-aluminum chloride;
(d) 0.5 kg./hour titanium trichloride The second autoclave is operated at a temperature of 35° C. The solids content of the suspension, reached therein is 9 percent by weight. The polymer produced has the following characteristic properties as measured by DIN (German Industrial Standard).

$\eta$ red=5.0 (reduced viscosity), DIN 53 727
$i_5$=0.3 (melt index), DIN 53 737

The heat is removed from the autoclave by wall cooling. The filling level in the autoclave corresponds to 6 cubic meters. This level corresponds to a weight of 4090 kg. From the hourly introduced quantities, the amount of catalysts present in the reactor can be determined:

diethyl-aluminum chloride—2.72 kg. correspg. to 22.5 moles
titanium trichloride—2.27 kg. correspg. to 14.7 moles Because of a fault in the polymer drying system, the reaction in the polymerization line has to be interrupted. The procedure followed on the second autoclave is:

(1) The inlet pipeline is closed.
(2) 12 kg. of a 10 percent by weight mixture of methanol in hexane are forced from a measuring vessel, by means of nitrogen under pressure, into the reactor, and are there stirred into the mixture. The amount of pure methanol is 1.2 kg. which are 37.5 moles (as each mole of diethyl-aluminum chloride has two alkyl groups, two moles of methanol are needed for complete conversion with one mole of diethyl-aluminum chloride) to achieve complete conversion of the alkyl groups of the above mentioned activation 22.6×2=45.2 moles of methanol would be needed. Hence, the conversion arrived at in this particular example is 37.5/45.2=83%.

(3) Two minutes later, the outlet pipelines are closed, their contents are thus also being deactivated. The stirrer remains running. The contents of the kettle now no longer show any temperature rise.

After an interval of several hours, during which the fault in the polymer drying equipment was eliminated, the polymerization is restarted through the following measures:

(1) Opening the inlet and outlet pipelines,
(2) Adding 2.5 kg. (corresponding to 20.8 moles) of diethyl-aluminum chloride, diluted with a four-fold quantity of hexane, and
(3) Start of normal introduction of material.

The reaction starts immediately. The polymer now formed does not differ in properties from the normal product. In particular, the $\eta$ red (reduced viscosity) value and the $i_5$ value (melt index) remain unchanged.

EXAMPLE 2

In the same series of autoclaves, operated under the conditions indicated above, the stirrer of the second fails. The follownig measures are taken:

(1) The inlet pipeline and the outlet pipeline are closed.
(2) 24 kg. of a 5 percent strength by weight mixture of methanol in hexane are forced by means of nitrogen under pressure from a measuring vesssel into the autoclave through the 8 bottom connections, the piston valves of which are opened simultaneously. Immediately thereafter, a stream of nitrogen of 50 cubic meters/hour at normal conditions flows for 7 minutes from below, through the 8 bottom connections, into the autoclave. The pressure in the autoclave rises from 2 atmospheres gauge to 5.5 atmospheres gauge.
(3) If required, the pressure in the autoclave can again be lowered by a slight pressure release. The contents of the autoclave no longer show a temperature rise.

After a pause of one hour, in which the fault in the stirrer was eliminated, the polymerization is restarted by opening the inlet and outlet pipelines, introducing 2.5 kg. of diethyl-aluminum chloride, diluted with a four-fold amount of hexane, and starting up the inlet pumps. The reaction starts immediately. Product of the normal quality is again produced, with $\eta$ red=5.0 (reduced viscosity)
$i_5$=0.3 (melt index)

We claim:
1. A method for interrupting the low pressure polymerization at a temperature between about 10 and 100° C. of an olefin in a catalyst system consisting of (1) an aluminum-organic compound having alkyl groups, hydride groups or a mixture of alkyl and hydride groups, and (2) a compound of a metal of sub-groups IV–VI of the Periodic Table which comprises adding with agitation about 15–100 more percent deactivator per mole of said alkyl and hydride groups of the aluminum-organic compound, the quantity of said deactivator not exceeding .45 percent by volume of the quantity of the dispersing or solving medium, said deactivator selected from the group consisting of: aliphatic, cycloaliphatic and aromatic alcohols having 1 to 8 carbon atoms, phenols having 6 to 16 carbon atoms, ethers having 2 to 10 carbon atoms, ketones having 3 to 10 carbon atoms, aldehydes having 1 to 10 carbon atoms, carboxylic acids having 1 to 12 carbon atoms; hydrogen halide, or water.

2. The method of claim 1 wherein an alcohol, an ether or a ketone is employed as the deactivator in an amount of from 30 to 100 mole percent, relative to the alkyl groups and hydride groups of the aluminum-organic compound.

3. The method of claim 2 wherein the deactivator is methanol, ethanol, a propanol or a butanol.

4. The method of claim 1 wherein an aldehyde or a carboxylic acid is employed as the deactivator in an amount of from 15 to 50 mole percent, relative to the alkyl groups and hydride groups of the aluminum-organic compound.

5. The method of claim 1, wherein hydrogen halide or water is employed as the deactivator in an amount of from 30 to 100 mole percent, relative to the alkyl groups and hydride groups of the aluminum-organic compound.

6. The method of claim 1, wherein a mixture of deactivators is employed.

7. The method of claim 1, wherein the deactivator is introduced in the form of a gas or diluted with an inert solvent, and is agitated by stirring with gas bubbles.

8. An apparatus for interrupting the low pressure polymerization of an olefin in a catalyst system comprising:
   (a) a polymerization reactor having a bottom with an inner wall;
   (b) inlet means connected to said bottom of the reactor with ends flush with said inner wall;
   (c) said inlet means having piston valving means;
   (d) liquid storage means for supplying a liquid deactivator;
   (e) first means for conducting fluids connected to said inlet means and said storage means;
   (f) gas container means for supplying gas under pressure; and
   (g) second means for conducting fluids connected to said storage means and said container means.

9. The apparatus of claim 8 further comprising check valve means in said first and second means for conducting fluids.

10. The apparatus of claim 9, wherein said inlet means comprises eight inlets and said first means for conducting fluids comprises eight conduits.

References Cited

UNITED STATES PATENTS

| | | | |
|---|---|---|---|
| 3,475,134 | 10/1969 | Weber et al. | 23—288 E |
| 2,973,350 | 2/1961 | Kennel et al. | 260—94.9 F |
| 3,131,033 | 4/1964 | Van Volkenburgh | 260—94.9 F |
| 3,177,184 | 4/1965 | Cottle | 260—94.9 P |

JAMES A. SEIDLECK, Primary Examiner

A. HOLLER, Assistant Examiner

U.S. Cl. X.R.

260—94.9 GD, 94.9 P; 23—288 E, 284